United States Patent
Schmidhuber et al.

[11] 3,804,337
[45] Apr. 16, 1974

[54] FLUID DISTRIBUTOR

[76] Inventors: Klaus Schmidhuber, Seestr. 34, 8031 Steinebach, Worthsee; Wolfgang Link, Buchenstr. 19a, 808 Furstenfeldbruck; Heribert Sturm, Dreifaltigkeitsberg 55, 8311 Rimbach, all of Germany

[22] Filed: June 18, 1973

[21] Appl. No.: 370,782

[52] U.S. Cl................ 239/513, 239/583, 239/602
[51] Int. Cl......................... B05b 1/28, B05b 11/00
[58] Field of Search .......... 239/507, 509, 510, 512, 239/513–516, 519, 521, 523, 579, 583, 602

[56] References Cited
UNITED STATES PATENTS

| 669,845 | 3/1901 | Melavin | 239/602 X |
| 2,253,600 | 8/1941 | Arneson | 239/602 X |
| 3,027,098 | 3/1962 | Helmer | 239/602 |
| 3,219,278 | 11/1965 | Santarelli | 239/583 X |
| 3,550,861 | 12/1970 | Teson | 239/602 X |

FOREIGN PATENTS OR APPLICATIONS

| 632,278 | 10/1927 | France | 239/602 |

*Primary Examiner*—Robert S. Ward, Jr.

[57] ABSTRACT

The invention relates to a variable outlet device for producing a controllable jet of a fluid, with a deflector mounted on the outlet end of the pipe or hose which delivers the fluid, the deflector having a deflecting surface which, starting near the edge of the jet, extend at first in the direction of the jet and then curves around in an axial plane of the pipe or hose with a radius of curvature several times greater than the internal diameter of the pipe or hose.

7 Claims, 4 Drawing Figures

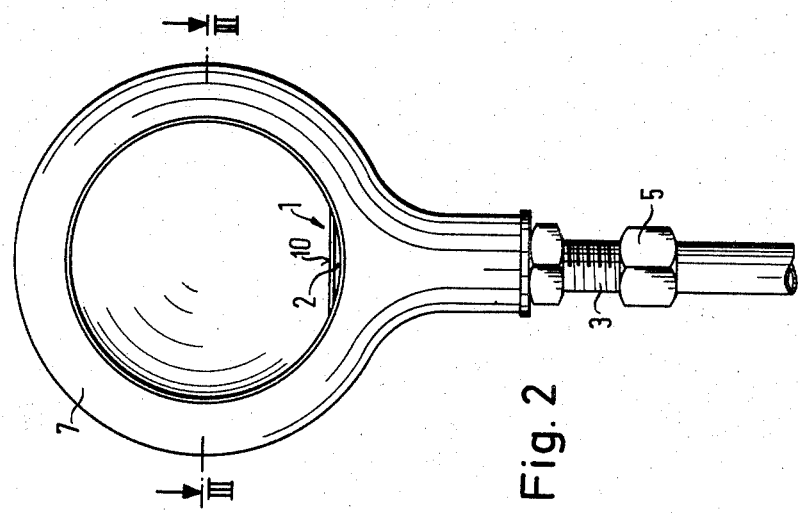
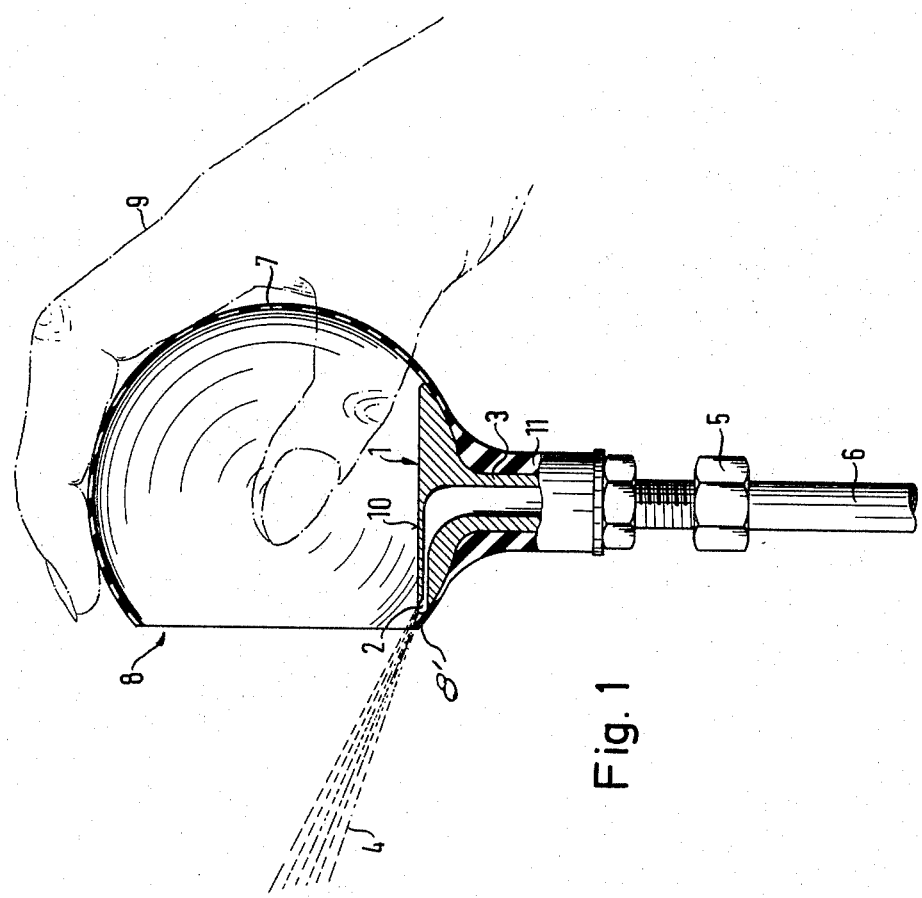

FLUID DISTRIBUTOR

The invention relates to a variable outlet device for producing a controllable jet of a fluid, with a deflector mounted on the outlet end of the pipe or hose which delivers the fluid, the deflector having a deflecting surface which, starting near the edge of the jet, extends at first in the direction of the jet and then curves around in an axial plane of the pipe or hose with a radius of curvature several times greater than the internal diameter of the pipe or hose.

A device of this kind is shown for example from the French Pat. Specification No. 632,278. A disadvantage of the known device is that although it allows the direction of the jet to be changed it provides almost no control over the shape of the jet.

The aim in the present invention, starting out from the known device, is to provide an improved variable outlet device arranged so that the operator can produce at will and with the greatest ease a jet of fluid easily, for example even playfully, variable in nature, by manipulating the device with his hand. There are a number of useful applications for a device of this kind. The central intention in the present invention is to enable human operators to control the nature of jets of fluids quite freely over the widest possible range of variations. Particular applications in which this kind of control over flowing fluids such as water, steam, warm air, moist air, fogs, sprayed muds and the like is desired, occur for example in the field of medical therapy in treatments involving douches and blowing with warm air, in the use of medical mists and vapours and in the application of medical coatings. There are further applications for example in the pedagogical treatment of handicapped children, in promoting tactile and communicational activities, particularly by means of games.

The problem is solved according to the invention in that the deflecting surface of the deflector which is a thin-walled structure made of a flexible, resilient material, has a double, cup-shaped curvature, the deflecting surface also curving in a plane perpendicular to the initial direction of the jet with a radius of curvature several times greater than the internal diameter of the pipe or hose.

The flexible, resilient construction of the deflector allows the operator to change the nature of the jet of fluid directly at the source of the jet. The dimensions of the deflector, the arrangement of the spherical curvature and the flexibility of the deflector wall, together with the cross section of the nozzle mouth and its position relative to the deflector, can be chosen over a wide range to suit the nature of the fluid and the intended application. For example the device can be intended as a plaything for children.

In a constructionally preferred example of the invention the deflecting surface has an essentially spherical concave curvature centered on the axis of the pipe or hose, the deflector containing a nozzle with an outlet mouth which aims a jet of fluid in directions perpendicular to the axis of the pipe or hose, the jet issuing from the nozzle mouth near the edge of an opening in the deflector, which is itself rotatable through at least 90° about the pipe or hose from an angular position in which the opening is in front of the nozzle mouth.

In the operation of a variable outlet device of this kind the nature of the jet produced can be varied in two ways, by rotating the deflector through an angle and/or by deforming it, that is to say changing its shape. Let it be assumed that the opening in the deflector is at first in line with the mouth of the nozzle. With rotation of the deflector, relative to the nozzle, an increasing fraction of the jet flows over the inner surface of the deflector, flowing on a spiraloid path before being projected from the lip of the opening in the deflector. Finally, when the deflector has been rotated through 180° with respect to the nozzle the resulting jet can, assuming a sufficient flow of fluid, take the form of a widely dispersed spray of fluid.

The operator can deform the thin, flexible wall of the deflector in various ways to squeezing it in different directions, changing the nature and direction of the jet by influencing it directly at its source, exxentially as though he is "moulding" the jet with his hand. The operator can therefore modulate the jet, as he pleases, by either one or both of two methods, by rotating the deflector and/or by squeezing or otherwise deforming it.

The size of the deflector can if desired be adapted for manipulation with one hand. On the other hand the deflector can if desired be made considerably larger, requiring manipulation by several hands, for example cooperative manipulation by several children.

The nozzle mouth can if desired be positioned so that the issuing jet strikes the lower lip of the opening in the deflector. The effect obtained is that the jet, which would otherwise issue from the nozzle mouth horizontally, that is to say in a direction perpendicular to the axis of the device, is now deflected by the lower lip of the opening in the deflector and issues as a ribbon curved in cross section and directed somewhat upwards, assuming of course that the opening in the deflector is in line with the nozzle mouth.

In order to prevent fluid from accumulating in a pool near the bottom of the deflector, assuming that the variable outlet device is mounted on the upper end of a vertical supply pipe, the nozzle on the end of the pipe connection can with advantage have a terminal external face approximately level with the lower edge of the opening in the deflector, the nozzle having a circular outer side surface which is a rotational sliding fit in the neck of the deflector, allowing the latter to rotate on the nozzle.

To ensure that the variable outlet device produces a ribbon-like, spread-out jet when the deflector opening is in line with the nozzle mouth, the nozzle preferably has a slot-like mouth, the nozzle preferably has a slot-like mouth directing a jet in directions perpendicular to the axis of the pipe or hose, the slot extending transversely with respect to this axis.

Finally the nozzle can if desired be arranged to slide axially with respect to the hose connection, the nozzle having a valve seat for a valve fixed to the end of the hose connection.

From the U.S. Pat. specification No. 3,027,098 it is known to mount on the end of the nozzle of a water pipe or hose a flexible, resilient somewhat tube-shaped deflecting device. This known deflector is however comparatively thick-walled and merely allows the shape of the jet to be changed from circular to ribbon-like, compare particularly the FIGS. 5 and 6 of this reference. A comparatively high water pressure is assumed. The known device merely allows the resulting high-velocity jet of water to be given the ribbon-shaped cross section represented in the FIGS. 5 and 6 in this reference, the jet subsequently retaining its cross-sectional shape. The cited reference neither claims nor provides the easy, rapid and varied manipulation of the jet obtainable by means of the present invention.

Two examples of the invention are shown in the drawing, in which:

FIG. 1 is an axial section through a first example of the variable outlet device, in this case for producing a controllable jet of water;

FIG. 2 is a front view showing in particular the deflector with its opening and, inside the deflector, a part of the nozzle through which the water is ejected;

Figure 3:
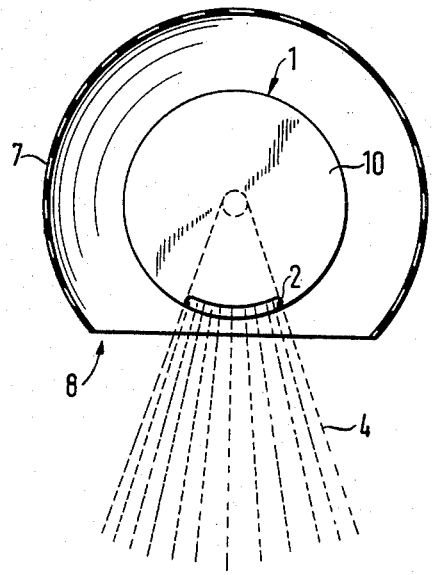
FIG. 3 is a horizontal cross section taken on the line 3—3 of FIG. 2.

The variable outlet device shown in FIGS. 1 to 3, for producing a controllable jet of water, comprises a nozzle 1 mounted on the outlet end of a pipe connection 3. The nozzle has an outlet mouth 2 which directs a jet 4 of water essentially radially with respect to the axis of the pipe connection. The latter is connected in the usual way, by means of a union nut 5, to a pipe 6 through which the water is supplied.

A deflector 7 is mounted on the pipe connection 3, rotatable about the latter, the deflector being essentially in the form of a hollow sphere centered on the axis of the pipe connection. The deflector 7 is made of a flexible, resilient material of construction and it is conveniently just large enough so that it can be comfortably gripped by the hand 9 of the operator. Using only one hand the operator can rotate the deflector 7, about the pipe connection 3, until the entire jet 4 of water impinges on the inner surface of the deflector. The deflector is so flexible that the operator can easily, using only one hand, deform the thin wall of the deflector in any way he pleases. This allows him to control the jet of water issuing from the nozzle outlet mouth 2 in a variety of ways and if he wishes he may reduce the power of the jet, by suitably deflecting it, and spread it out or break it up.

The nozzle 1 has a terminal external face 10 approximately at the level of the lower edge of an outlet opening 8 in the deflector 7. The outer peripheral side surface of the nozzle 1 is circular in cross section and is a sliding rotational fit in the neck 11 of the deflector 7, allowing the latter to be rotated about the nozzle but still making a watertight seal. The flat external terminal face 10 of the nozzle 1 prevents a residual pool of water from remaining inside the deflector 7 when the spraying operations are terminated. In this example the lower edge 8' of the outlet opening 8 in the deflector 7 is a little above the nozzle outlet mouth 2, with the result that when the opening 8 is positioned just in front of the nozzle mouth 2 the jet 4 issues as a ribbon of water curved in cross section and directed somewhat upwards.

Figure 4:
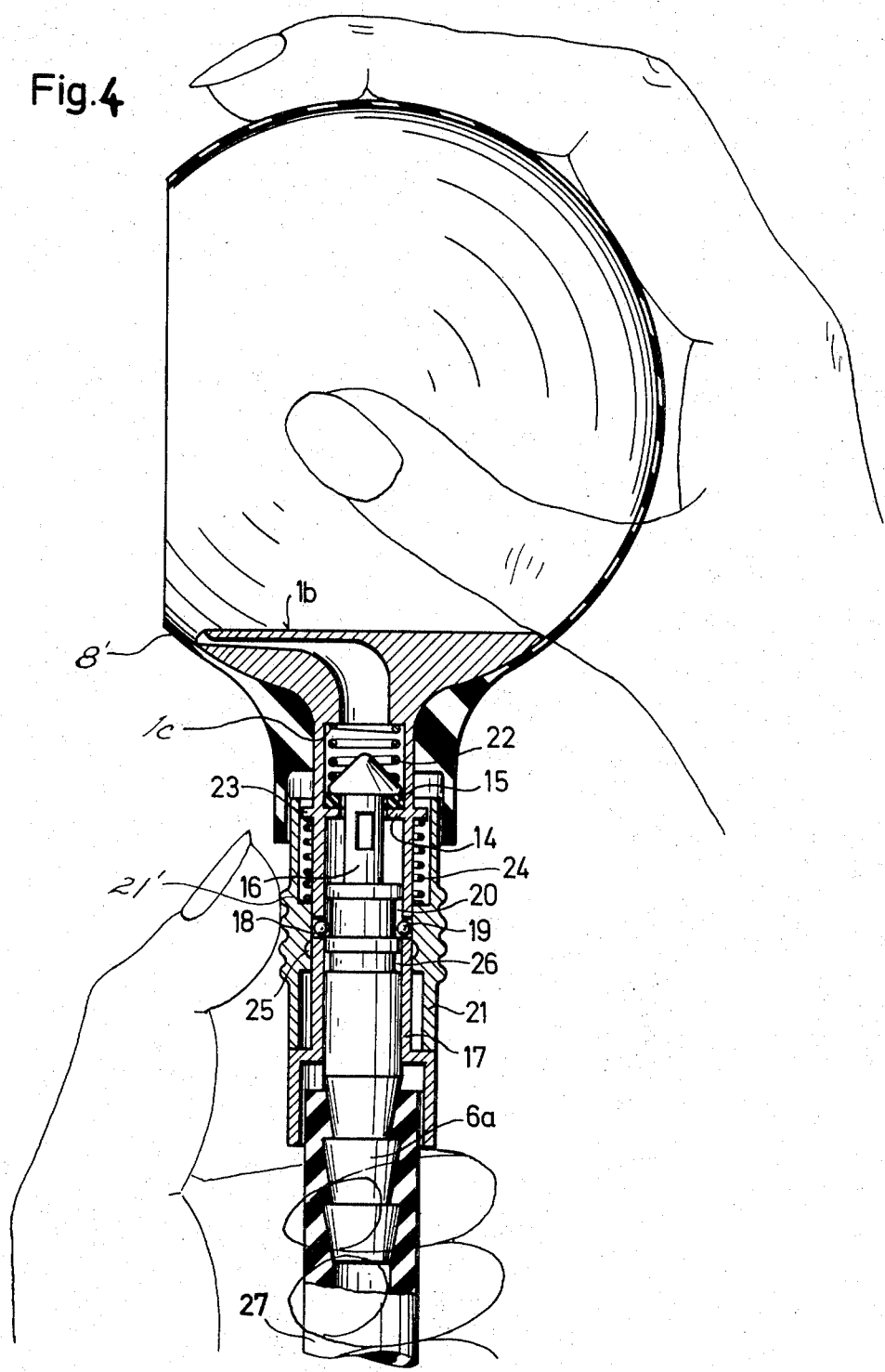
FIG. 4 is an axial section, drawn to a larger scale, through a second example of the invention, also for producing a controllable jet of water, the variable outlet device in this case containing a valve.

In the modified version of the invention shown in FIG. 4 the nozzle 1b is arranged so that it can slide axially within limits on the end of the hose connection 6a. For this purpose the lower part of the nozzle 1b is in the form of a guiding sleeve 17 which has an internal collar 14 supporting a sealing ring 15 which forms a seat for a mushroom valve head 16, of the usual kind, which itself forms the upper part of the hose connection 6a. The guiding sleeve 17, which forms the lower part of the nozzle 1b, has, below the internal collar 14, a number of openings 18 occupying a transverse plane. Each opening 18 contains a ball 19 whose diameter is a little greater than the wall thickness of the guiding sleeve 17. In FIG. 4 the device is shown with the valve completely closed. Under these circumstances the balls 19 project inwards into an external annular groove 20 of the hose connection 6a, the balls being prevented from escaping radially outwards by an actuator sleeve 21. A helical compression spring 22 thrusts upwards against an upper internal collar 1c of the nozzle 1b and downwards against the upper surface of the mushroom valve head 16. With the parts in the positions shown the spring 22 therefore holds the valve head 16 firmly down against its seat 15.

A second helical compression spring 24, surrounding the guiding sleeve 17, thrusts upwards against an external collar 23 projecting radially outwards from the guiding sleeve 17 on a level with the internal collar 14, and thrusts downwards against an internal collar 21' of the actuator sleeve 21. The spring 24 therefore tends to hold the actuator sleeve 21 firmly down in its lower limiting position relative to the guiding sleeve 17.

To open the valve and allow water to escape through the nozzle 1b, the operator slides the actuator sleeve 21 upwards, relative to the guiding sleeve 17, against the influence of the compression spring 24. As soon as the actuator sleeve 21 has slid upwards far enough, relative to the guiding sleeve 17, the balls 19 move radially outwards into an internal annular groove 25 of the actuator sleeve 21. This allows the operator to thrust the entire nozzle 1b, with its guiding sleeve 17, downwards relative to the hose connection 6a, the balls 19 finally entering a lower external annular groove 26 of the hose connection 6a. This opens the valve, allowing water to escape through the nozzle 1b. The operator can now, if he wishes, lock the valve in the open position by releasing the actuator sleeve 21 so that the latter, thrust downwards by the compression spring 24, slides downwards relative to the guiding sleeve 17, locking the balls 19 in the lower groove 26 and so locking the valve in its open position.

Subsequently when the operator wishes to close the valve, he slides the actuator sleeve 21 upwards once more, relative to the guiding sleeve 17, allowing the balls 19 to excape radially outwards into the groove 25. Consequently the upper compression spring 22 now lifts the nozzle 1b, relative to the hose connection 6a, closing the valve. As soon as the operator finally releases the actuator sleeve 21 this slides downwards again, relative to the guiding sleeve 17, locking the balls once more in the upper groove 20.

It should be observed that the invention is not limited in all details to the examples described and presented. For example the deflector 7 need not be rotatable about the nozzle 1. The deflector could for example take the form of an extension of a flexible hose conveying the water. Furthermore the nozzle 1 need not have a slot-shaped mouth, although this shape is preferred for the presently intended purpose because it produces a widely spread-out jet. Finally the deflector 7 can if desired be considerably larger in dimensions, assuming that a greater supply of water is available. In this case the deflector 7 would be for manipulation by more than one hand. The example described above in which the valve is actuated by axial movement of the nozzle has the advantage that the control of water flow is dependent of rotation of the deflector. Nevertheless the valve can if desired be actuated by rotation of the deflector, although this arrangement limits the operator's control over the nature of the jet. As already mentioned the device can if desired by arranged for delivering, instead of a jet of water, a jet of a different kind of fluid, without leaving the framework of the invention as defined in the patent claims.

We claim:

1. A variable outlet device for producing a controllable jet of a fluid, comprising a deflector mounted on an outlet end of fluid delivery means, the deflector having a deflecting surface which, starting near the edge of the jet, extends at first in the direction of the jet and then curves around in an axial plane of the said fluid delivery means with a radius of curvature several times greater than the internal diameter of the fluid delivery means, wherein the improvement comprises the deflecting surface of the deflector being relatively thin-walled and formed of flexible, resilient material, having a double, cup-shaped curvature, said deflecting surface curving in a plane perpendicular to the initial direction of the jet with a radius of curvature several times greater than the internal diamter of the fluid delivery means.

2. A variable outlet device as defined in claim 1, wherein the deflecting surface has an essentially spherical concave curvature centered on the axis of the fluid delivery means, the deflector including a nozzle with an outlet mouth adapted to aim a jet of fluid in directions perpendicular to the axis of the fluid delivery means, the jet adapted to issue from the nozzle mouth near the edge of an opening in the deflector, which is adapted to rotate through at least 90° about the fluid delivery means from an angular position in which the opening is in front of the said nozzle outlet mouth.

3. A variable outlet device as defined in claim 2, wherein the nozzle mouth is adapted to be positioned so that the issuing jet strikes a lower lip of the opening in the deflector.

4. A variable outlet device as defined in claim 1, wherein the said nozzle on the end of the fluid delivery means has a terminal external face approximately level with the lower edge of the opening of the deflector, the nozzle having a circular outer side surface which is a sliding rotational fit in the neck of the deflector, allowing the latter to rotate on the nozzle.

5. A variable outlet device as defined in claim 2 wherein the said nozzle on the end of the fluid delivery means has a terminal external face approximately level with the lower edge of the opening of the deflector, the nozzle having a circular outer side surface which is a sliding rotational fit in the neck of the deflector, allowing the latter to rotate on the nozzle.

6. A variable outlet device according to claim 1 wherein the nozzle has a slot-like mouth directing the jet in directions perpendicular to the axis of the fluid delivery means, the slot extending transvarsely with respect to this axis.

7. A variable outlet device according to claim 1 wherein the said nozzle is arranged to slide axially with respect to the fluid delivery means connection, the nozzle forming a valve seat for a valve fixed to the end of the said connection.

* * * * *